Sept. 25, 1945.  H. SCHULZ  2,385,474
DEBURRING MACHINE
Filed June 19, 1944

INVENTOR.
Herman Schulz
BY
Loftus, Moore, Olson & Trexler
attys.

Patented Sept. 25, 1945

2,385,474

UNITED STATES PATENT OFFICE 2,385,474

DEBURRING MACHINE

Herman Schulz, Chicago, Ill., assignor to Rudolph H. Schulz, doing business as Master Machine Products, Chicago, Ill.

Application June 19, 1944, Serial No. 540,952

4 Claims. (Cl. 164—40)

The present invention relates to a deburring machine and more particularly to a machine adapted for deburring screw machine products.

In the manufacture of screw machine products, particularly in the case of automatic screw machine products, the operation is completed on the stock and thereupon the product is severed from the stock by a cutting action beginning at the outer periphery and extending toward the center. At a certain point the strength of the material is insufficient to hold the completed member and consequently the member drops off with a slight burr at the end of the member. Heretofore this has necessitated grinding off the end of each member so produced and entailed considerable labor and often resulted in considerable variation in the appearance of the finished product dependent upon which workman would do the grinding as some would grind more than others. It, therefore, would be highly desirable to provide some arrangement whereby screw machine products and other products also formed with burrs thereon could be uniformly deburred with a minimum of labor.

In accordance with the present invention this is accomplished by providing a motor driven device or machine for deburring machine products uniformly. By means of this machine each of the products is inserted into a guide and the burr is sheared off. When the burr is sheared off no further operation can take place on the machine product. This is accomplished by providing a stationary guide and shear plate and a rotary shearing element which latter element is moved at a moderate rate of speed.

It, therefore, is an object of the present invention to provide an improved machine for deburring machine products.

Still another object of the present invention is to provide an improved deburring machine which is readily suited to accommodate various sizes of products.

Still another object of the present invention is to provide an improved deburring machine which is simple to operate and which is readily serviced and maintained in proper operating condition.

Other and further objects of the present invention subsequently will become apparent by reference to the following description taken in connection with the accompanying drawing wherein Figure 1 is a side view of a deburring machine constructed in accordance with the present invention;

Figure 1:
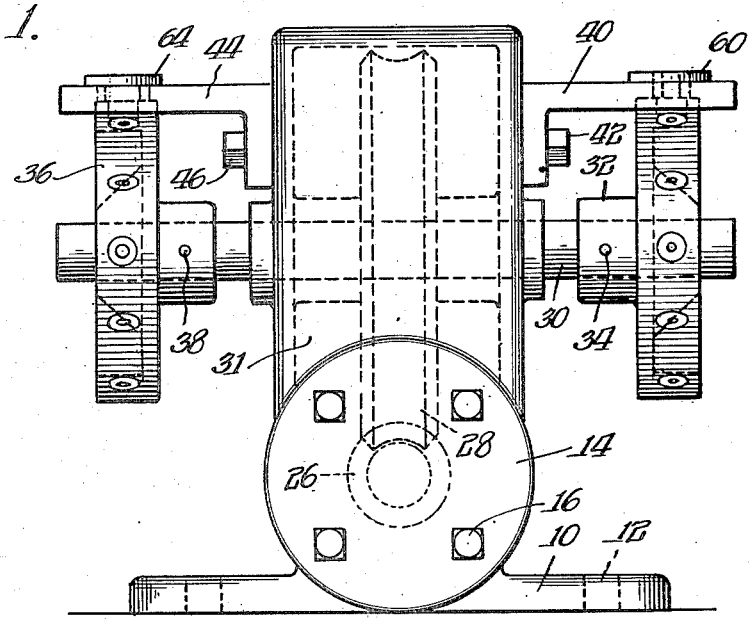
Figure 2:
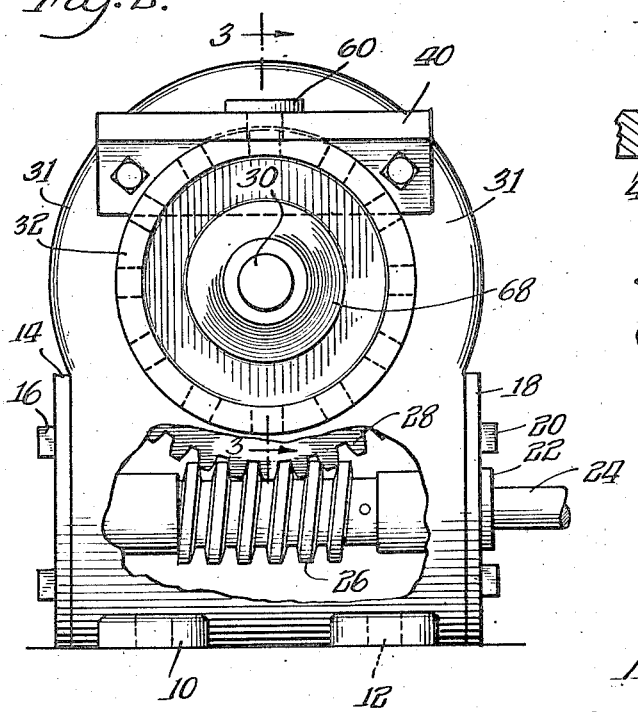
Figure 2 is an end view of the machine shown in Figure 1 with a portion thereof broken away to show the internal construction.

Referring to the drawing it will be seen that there is shown a machine having a base 10 provided with suitable apertures 12 therein whereby the machine may be secured by bolts or fastening members to a bench or support. At the front of the machine the base 10 is provided with a cover plate 14 held in position by suitable cap screws 16. At the rear of the machine a similar cover plate 18 is provided held in position by cap screws 20. The rear cover plate 18, however, is provided with a suitable opening surrounded by a bearing portion 22 through which a shaft 24 extends from the exterior of the machine to the interior. On the interior of the machine connected to the shaft 24 is a worm gear 26 arranged to drive a gear wheel 28. The gear wheel 28 is connected to a shaft 30 extending to either side of the upper housing 31 of the machine. On one end of the shaft 30 is provided a wheel 32 having a collar portion which may be secured by a suitable pin 34 to the shaft 30. At the other extremity the shaft 30 is also provided with a wheel 36 having a collar portion secured by a pin 38 to the shaft 30. Since the wheels 32 and 36 are similar, only the wheel 32 will be described in detail. Immediately above the wheel 32 there is provided a bracket-like member 40 secured in position by fastening means such as cap screws 42 to the upper portion of the housing 32. A similar bracket member 44 is secured by cap screws 46 so as to be positioned above the wheel 36.

Figure 3:
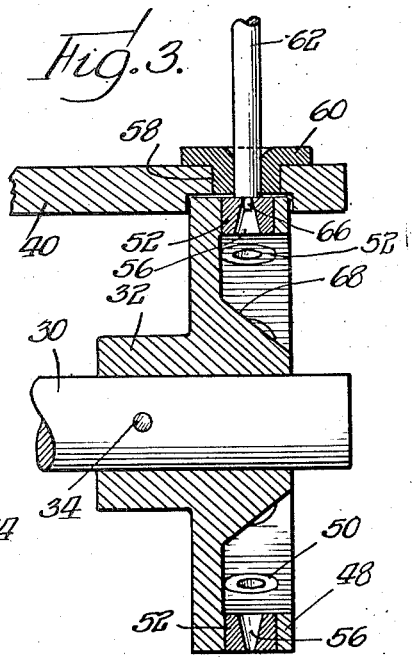
Figure 3 is an enlarged view in cross section through a portion of the machine as seen in the direction of the arrows along the line 3—3 of Figure 2.

The wheel 32 is shown in detail in Figure 3 from which it becomes apparent that the wheel is provided with a flanged rim 48. This flange or rim 48 of the wheel 32 is provided with a plurality of apertures 50 each having therein an apertured bushing member 52. The apertured bushing member has a frusto-conical aperture 56. The bushing member 52 is arranged so as to be easily removed from the wheel 48 for servicing and sharpening and for replacement. Preferably the member 52 is formed of a material which is harder than the material of the wheel 32. The bracket 40 mounted just above the wheel 32 is provided with a suitable aperture 58 in which there is mounted a bushing end guide member 60 having an aperture of such dimension as to closely fit about the machine product 62 which is to be inserted therein. The other bracket 44 on the other side of the machine is provided with a similar bushing member 64 which, however, may have an aperture slightly different in diameter so as to accommodate different size machine products. From the showing in Figure 3 it will be seen that the machine product 62 has a burr 66 extending into the aperture 56 of one of the bushings 52. It will readily be appreciated that rotation of the wheel 32 will bring about a shearing off of the burr 66.

In operation power supplied to the shaft 24 and the speed of the applied power is reduced by the worm gear 26 and the gear 28 so that the shaft 30 is rotated at a moderate rate of speed. An operator takes a machine product such as the member 62 and inserts the product into the aperture of the guide member 60 and the bracket 40. The aperture in the guide 60 is such as to hold with reasonable security the machine product 62 in a position substantially perpendicular to the tangent of the wheel flange 48. Assuming that the burr 66 engages a portion of the flange 48 between two of the apertures 56, the operator may hold the machine product 62 until the burr engages an aperture 56 and a click is heard whereupon the burr has been removed. New machine products are continuously fed to the wheels through the guides 60 and 64 so as to deburr the products. Since the end of the product such as the member 62 has a relatively broad end surface, no other portion of the wheel 32 will have other than sliding engagement with the end of the machine product and hence the ends of all machine products deburred in this manner have a uniform appearance.

From the foregoing description it will readily be appreciated that there has been provided a deburring machine which is relatively simple to construct and to maintain and which operates at a relatively low rate of speed. The slow speed of operation of the deburring machine reduces the hazard heretofore encountered when burrs were removed by grinding operations. The burrs 66 fall through the aperture 56 in the bushing 52 and strike the inclined surface 68 of a portion of the wheel 32 which is so formed and positioned as to constitute a means which will throw the burr 66 away from the machine and the shaft 30. The machine, therefore, is self cleaning and requires no special attention on the part of the operator.

While for the purpose of illustrating and describing the present invention a preferred embodiment has been shown in the drawing it is to be understood that the invention is not to be limited thereby since obviously such other embodiments and variations are intended as are commensurate with the spirit and scope of the invention as set forth in the appended claims.

This invention is hereby claimed as follows:

1. A machine for deburring machine products comprising a frame having a shaft, a wheel mounted on the shaft, said wheel having a hub, a web, and a flanged rim, said rim extending laterally in one direction from said web and being provided with a plurality of spaced apart openings therein having axes along radii of said wheel, each opening having a removable bushing provided with a frusto-conical aperture, a stationary member positioned over the rim of said wheel, said member having an arcuate portion closely adjacent the periphery of said wheel rim, an aperture in said member arranged in the plane of the openings of said wheel, and a removable guide mounted in the opening of said member for receiving said machine products to be deburred.

2. A machine for deburring automatic screw machine products comprising a vertical wheel having a flanged rim extending in one direction normal to the plane of the wheel and provided about the periphery thereof with a plurality of spaced apart openings, each opening being provided with an apertured bushing of hardened material, and a stationary frame member having an arcuate portion positioned adjacent the periphery of said wheel, said member having an opening in the plane of the openings of said wheel and along an extended radius thereof, said opening provided with a hardened bushing to guide said screw machine products so that the burr thereon will enter one of the apertured bushings in said wheel.

3. A machine for deburring machine products comprising a frame carrying a shaft, a wheel mounted on said shaft, said wheel being arranged to operate at a moderate speed and having a flanged rim and having a plurality of spaced apart apertures, each aperture being provided with a removable bushing having a frusto-conical aperture of a size slightly larger than the burr to be received thereby, a stationary member positioned above the rim of said wheel, said member having an arcuate portion closely adjacent the periphery of said wheel, an aperture in said member arranged in the plane of the apertures in said wheel and perpendicular to a plane tangent to said wheel, and means for holding machine products for guiding burrs into said wheel apertures including a removable guide mounted in the aperture of said stationary member having an opening of such size as to fit the machine product, said wheel having an enlarged hub portion of such configuration as to force away from said machine frame burrs sheared off from said machine products.

4. A machine for deburring machine products comprising a frame having a shaft, said machine being adapted to be driven from a source of power, means interposed between said shaft and said source of power for reducing the speed of the applied power so as to drive said shaft at a moderate speed, a wheel mounted on said shaft, said wheel having a transversely extending peripheral portion provided with a plurality of spaced apart apertures each having a frusto-conical shape and of a size slightly larger than the burr to be received thereby, a cooperating stationary member positioned above the peripheral portion of said wheel, said member having an arcuate portion closely adjacent to the periphery of said wheel, said stationary member being provided with a guide for receiving and supporting machine products, said guide being positioned perpendicular to a plane tangent to said wheel and in the plane of the apertures of said wheel whereby machine products may be manually placed within said guide for deburring by said wheel, and means for directing sheared burrs away from said wheel comprising an enlarged hub portion of said wheel having a frusto conical configuration.

HERMAN SCHULZ.